Figure 1:
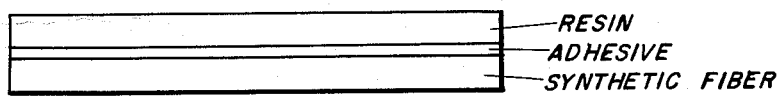
Figure 2:
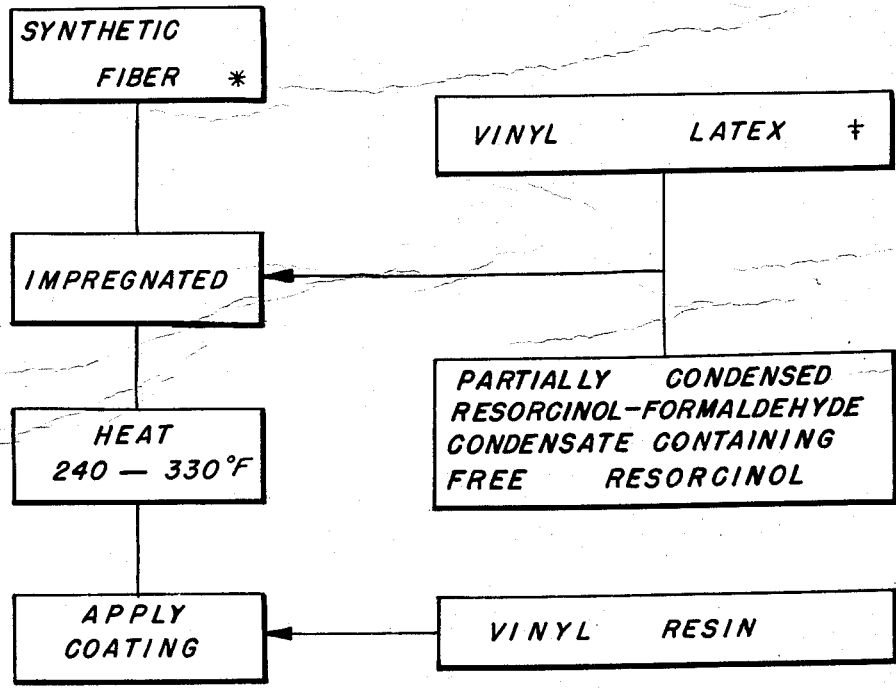

Nov. 22, 1960     E. C. ATWELL     2,961,343
ADHESION OF VINYL RESINS TO NYLON OR
OTHER SYNTHETIC FIBROUS MATERIALS
Filed Aug. 16, 1957

\* NYLON, POLYETHYLENE TEREPHTHALATE
OR POLYMERIC ACRYLONITRILE FIBERS

† POLYVINYL CHLORIDE OR VINYL
CHLORIDE — VINYL ACETATE
COPOLYMER LATEX

INVENTOR
*Everett C. Atwell*

BY *Cushman, Darby & Cushman*
ATTORNEYS

United States Patent Office 2,961,343
Patented Nov. 22, 1960

2,961,343

ADHESION OF VINYL RESINS TO NYLON OR OTHER SYNTHETIC FIBROUS MATERIALS

Everett C. Atwell, Greensboro, N.C., assignor to Burlington Industries, Inc., Greensboro, N.C., a corporation of Delaware Filed Aug. 16, 1957, Ser. No. 678,519

9 Claims. (Cl. 117—76)

This invention relates to the art of preparing laminated and coated synthetic fabrics and fibrous materials.

In particular, this invention has utility in preparing polyvinyl resin-coated nylon, Dacron, Orlon and Acrilan textile materials and laminated products derived therefrom as will be more specifically set forth and described hereinafter.

It is well recognized that valuable products can be made by coating a textile material with resinous polymers of varying characteristics to produce a product having the desirable properties of water, chemical and abrasion resistance, characteristic of the coating material and the dimensional stability and strength of the textile material. The various applications to which the coated product is to be put are determined to a large degree by the type of coating agent which has been applied. Such coatings may be in general of a thermosetting or thermoplastic type.

The well known chemical and physical properties of synthetic fibrous materials such as nylon, Dacron, Orlon and Acrilan, indicate the desirability of these materials as the textile base for such a resin-coated product as described above. Equally well, the properties of polyvinyl resinous polymers and copolymers indicate their desirability as coating agents on such a textile material. However, this combination of materials, namely, nylon, Dacron, Orlon or Acrilan fiber with a polyvinyl resin, has in the past been an unsatisfactory one to obtain a coated and/or laminated material.

The difficulty which has been experienced in coating the above-mentioned textile materials with a polyvinyl resin has resulted from the fact that there is a very weak adhesion between the resin and the textile. Recently, this problem has been alleviated to some extent by the development of certain isocyanates which were found to provide an improved adhesion between materials such as polyvinyl chloride and nylon.

While a welcome improvement, this development has nevertheless presented its own undesirable features and problems. The fact that an isocyanate must be used in an organic solvent free of water and containing no reactive hydrogen in its molecular structure immediately suggests the industrial hazards encountered as a result of the volatile, flammable, organic solvents. Since the vapors of the isocyanates are also extremely toxic, the use thereof in such volatile solvents necessarily imposes careful manipulative techniques and costly equipment.

The present invention avoids the above-discussed problems in the prior art in providing a superior composition for use as a bonding agent between the above-noted synthetic fibers and the polyvinyl resin coating.

It is therefore an object of this invention to provide a novel adhesive composition for use in bonding thermoplastic polyvinyl chloride and polyvinyl acetate resins to synthetic fibers of the nylon, Dacron, Orlon, or Acrilan types.

More specifically, it is an object of this invention to provide an adhesive composition having these properties which is composed of resorcinol, a resorcinol-formaldehyde condensation product and a polyvinyl chloride or vinyl chloride-vinyl acetate copolymer resin in an aqueous dispersion. It will also be seen to be a further object of this invention to provide such an adhesive composition in the preparation and use of which organic solvents are not required.

A still further object of this invention is to provide a process for bonding the above noted synthetic fibers to a polyvinyl resin coating substance by impregnating said fibers with a resorcinol, resorcinol-formaldehyde, and polyvinyl chloride or vinyl chloride-vinyl acetate copolymer resin latex-containing aqueous dispersion, and then heating the impregnated material to cure the bonding composition.

Still another object of this invention is to provide a new material comprising a synthetic fibrous material or fabric having bonded thereto a polyvinyl resin by means of an adhesive or bonding composition composed of a resorcinol-formaldehyde condensation product and a polymeric vinyl chloride-vinyl acetate latex resin.

Other objects will become apparent from the detailed description as set forth hereinafter.

In the drawings are illustrated schematically the composite rubber coated synthetic fibrous material and the method of applying the coating.

Without being bound thereto in any manner, applicant believes that the successful operation of this invention depends upon the scientific principles as will be discussed in conjunction with the following description of the invention.

In the following description it will be understood that by "nylon" I refer to polyhexamethylene adipamide materials such as are described, for instance, in United States Patent No. 2,071,250; and also to fiber-forming polymers such as are formed from epsilon-caprolactan; by "Dacron," I refer to the polyterephthalate ester fiber-forming polymers such as are described in, for instance, United States Patent No. 2,463,319; "Orlon" and "Acrilan" are well-known names for polymeric acrylonitrile fiber-forming materials. For brevity, the terminology "synthetic textile material" will be used hereinafter to indicate and as being, in this application, generic to nylon, Orlon, Dacron and Acrilan fibers and fabrics. As used hereinafter, "synthetic textile material" does not encompass other compositions which might normally fall within the scope of that term, for this invention does not apply to such a broad range of substances. For instance, the presently provided adhesive composition is ineffective as a binder between the polyvinyl resin coating and rayon.

The development of a strong adhesive bond between the synthetic textile material and a polyvinyl-resin coating depends upon providing an agent which will have adhesive properties toward both components, since the adhesion between the textile material and the polyvinyl resin is too small to be of any practical consequence. I have discovered that this can be achieved for the above noted synthetic textile materials by the use of a three-component composition comprising an aqueous dispersion of (1) resorcinol, (2) a resorcinol formaldehyde condensation reaction product, and (3) a polyvinyl chloride or polymeric vinyl chloride-vinyl acetate copolymer resin latex. I believe that this composition functions as a result of bonding forces between the polyvinyl chloride or polymeric vinyl chloride-vinyl acetate copolymer resin latices and the polyvinyl resin coating; between the above noted latices and the resorcinol-formaldehyde condensation reaction product; and the ability of resorcinol to act as a swelling agent for the textile materials.

It is believed that when the textile material is impregnated with the composition provided by this invention, the free resorcinol therein enters the individual fibers and filaments of the textile material and during the subsequent heating treatment, as will be more specifically described hereinafter, the condensation reaction continues between the free resorcinol and the already formed resorcinol-formaldehyde condensation product, in the dispersion on the surface of the filaments, to extend the polymeric chains and to include as units therein at least some of the resorcinol molecules disposed within the filament structure. As a result of this action, a very strong bond is obtained between the dispersion and the textile material. At the same time, the resorcinol-formaldehyde condensation product is itself firmly bonded to the polyvinyl resin and there is achieved, as a result, a polyvinyl coating on the substrate textile material which is strongly secured thereto.

It will be apparent to one skilled in the art that the compositions of this invention also lend themselves to the formation of laminated materials as a result of impregnating several layers of cloth and individually coating them as desired, followed by a heat treatment, under pressure if desired.

Broadly speaking, the manipulative technique employed in practicing this invention comprises mixing resorcinol and formaldehyde in water and allowing these two compounds to react. This time/temperature controlled reaction will take place at a temperature of from about 50° F. to 90° F., but it is preferred to operate within the range of from 72° F. to 78° F. At the lower temperature, i.e., between 50 and 60° F., the reaction is prolonged, and above 78° F. the reaction will tend to get out of control and advance to the point where the whole mass gels. When operating in the preferred range, it is preferred to let the condensation advance for six hours before mixing with the vinyl resin latex.

A small amount of an alkali catalyst may be added, such as any of the alkali metal hydroxides, i.e., hydroxides of the metals in group 1(a) of the periodic table, e.g., lithium, sodium, potassium, rubidium, and cesium. By "small amount" in the preceding sentence is meant an amount of from about 0.5 to about 5% of the total reaction mixture by weight. It will be appreciated that the exact amount of catalyst is not critical and the choice of suitable quantities will be within the skill of the art in any particular case.

The amount of resorcinol and formaldehyde present in the reaction mixture is such as to provide a final concentration of the resorcinol-formaldehyde reaction product, commonly referred to as the resol product, of from about 6% to 20%, preferably in the range of from about 6% to about 10%, by weight. This concentration range is of some importance in the subsequent operations in this invention wherein gelation must be avoided. The choice of concentration is also important in permitting control of the temperature of the initial reaction.

In preparing the resol product according to this invention, the ratio of the amount of resorcinol to formaldehyde in the reaction mixture must be between approximately 1:1.2 and 1:2.75. It has been found that an increase to 2.85 molecular equivalents of formaldehyde for each molecular equivalent of resorcinol results in gelation of the final mixture within a matter of hours following preparation. On the other hand, if the amount of resorcinol is decreased to 1.00 molecular equivalence for each 1.4 molecular equivalents of formaldehyde, a less viscous emulsion is produced which has great stability but without loss of potential for binding polyvinyl resin compositions to the synthetic textile material.

After the initial reaction has taken place and the resol product has been formed, a vinyl chloride-vinyl acetate latex, or, if desired, a polyvinyl chloride latex, is admixed therewith. To avoid gelation, the latex should be mixed with the resol product soon after completion of the resol reaction period. That is, the resol reaction mixture should not be allowed to stand for a period of time greater than from about 12–20 hours. Such storage at that point may result in a gelation of such resol product and may prevent the subsequent appropriate mixing and reaction with the latex.

The latex is added in an aqueous dispersion, as indicated hereinabove, and, as commercially obtained, such dispersions have a concentration of about 50% solids. This solids content is accordingly desirable from an economic point of view. This invention is not, of course, limited to such a specific concentration and in fact is limited only to the dilution factor in accordance with the percentage of solids preferred for the specific application at hand.

The amount of latex dispersion added is such as to provide a ratio of resol to latex solids within the range of from about 1:12 to about 1:3. At ratios substantially outside of this range, the mixture will be inoperative to produce the desired results. Thus, at a ratio of 1:2, the concentration of the resol resin is so high that gelation takes place almost immediately after preparation although at ratios of 1:4 and lower, the resol concentration is not high enough to induce gel formation even over a period of months. At a resol concentration less than 1:12, the adhesive properties of the resultant mixture are diminished to an unfavorable extent.

The preparation of this composition according to this invention has the advantage that a stable dispersion is produced while at the same time all of the formaldehyde has been added initially to the reaction mixture. It has previously been the practice to make up the resorcinol-formaldehyde condensate with a deficiency of formaldehyde, as a safeguard against gel formation, and then, at the time of use, to add the balance. This complicated technique is avoided by the present invention.

The introduction of the aqueous latex dispersion further reduces the resol resin concentration which decreases the danger of gelation and thereby increases the stability of the aqueous composition. Since it is desirable to obtain such a composition which can be stored for months without loss of physical or adhesive properties, further steps may be taken to insure the stability characteristics. I have found that the vinyl emulsion should have an alkaline pH and preferably a pH of at least 9. If the pH is below 7, gelation will take place. Accordingly, for the purpose of obtaining a stable composition, it is desirable and good practice in this invention to add aqueous ammonia to the composition to assure and maintain this condition of alkalinity. The aqueous ammonia may be added at any stage, that is, in the resol resin dispersion, in the latex dispersion, or to the mixture of these two. I prefer to add the ammonia to the latex dispersion or to the mixture. The amount of ammonia added is not in itself critical so long as a sufficient quantity is present to preserve the desired alkalinity discussed above. Generally speaking, an amount of from about 0.25% to 0.50%, desirably about 0.4%, by weight of the total mixture, will be sufficient.

The polyvinyl latices which are suitable include plasticized polyvinyl chloride and polymeric vinyl chloride-vinyl acetate copolymer. It is of further interest that only the polyvinyl chloride and polymeric vinyl chloride-vinyl acetate copolymer resins are suitable for use in this invention. Other polyvinyl resins such as polyvinyl pyridene or a 75/25 polymeric butadiene/polyvinyl pyridene latex may be added to the resol product dispersion and will serve, as is well known, as a promoter of adhesion between rayon or nylon, and rubber, natural or synthetic, but this composition does not increase the bond between nylon and polyvinyl resin coatings.

The polyvinyl resin which may be used as the coating material in the process of the present invention will generally be of the type marketed under the trade name of "Geon" by B. F. Goodrich Chemical Co. Geon latices as used in this invention are generally polymeric vinyl chloride resins having a viscosity of about 0.4 unit on an arbitrary scale on which the commonly employed polyvinyl resins have a viscosity index of 0.6. These are non-vulcanizable plasticized thermoplastic materials which fuse at a temperature within the range of from about 260° F. to 300° F. An unplasticized resin may also be used as the starting material in this invention provided one adds to it a plasticizer prior to incorporating into the resol dispersion. This invention employs these materials in aqueous dispersion having a solids content conveniently of about 50% and an average viscosity of about 20–37 centipoises. The concentration of 50% solids is not critical although commonly commercially available.

After the above described resin/latex dispersion mixture has been obtained, the textile material will be impregnated therewith by any suitable means such as, for instance, dipping a continuous band of the fabric into the dispersion. Water can then be removed from the goods by drying as desired. Thereafter, the impregnated material is heated at a temperature within the range of from about 240° to 330° F. In this temperature range, the above described reaction of the resorcinol with the formaldehyde will proceed in situ to completion.

In order that this invention may be clearly understood, the following examples are proved by way of illustrating suitable compositions which may be successfully employde in the manner described above. It will be appreciated that the invention is by no means limited to the specific compositions set forth in these examples.

EXAMPLE 1

*Adhesive composition*

PART A

| | |
|---|---|
| Resorcinol (1 molecular equivalent) ____parts__ | 110.1 |
| 37% formaldehyde (2 molecular equivalents) _____do____ | 162 |
| NaOH _____do____ | 2.5 |
| Water _____do____ | 2547 |
| | 2821.6 |

PART B

| | |
|---|---|
| Resin master (part A) _____parts____ | 244 |
| 55% vinyl chloride-acetate latex _____do____ | 162 |
| Aqua ammonia _____do____ | 4.0 |
| Water _____do____ | 662 |
| | 1072 |

The resorcinol and formaldehyde were added to and thoroughly mixed in the aqueous sodium hydroxide solution in the amounts described under part A above. The mixture was held at a temperature between 72 and 78° F. and allowed to react for a period of six hours. The resol reaction product resulting therefrom is called the Resin Master.

While the mixture was being stirred, the Resin Master and the polymeric vinyl-chloride-vinyl acetate latex were added to the aqueous ammonia solution in the amounts indicated at part B above.

The resulting combined composition exhibited excellent storage stability characteristics and could be kept without deleterious gelation taking place for a period of months.

A piece of nylon fabric was impregnated with this composition by dipping, excess solution was removed with a doctor blade, and water was removed by heating. On heating to a temperature between 240° and 330° F. for completion of the condensation reaction, this cured-resin impregnated cloth was then spread-coated with the vinyl chloride resin organosol and heated to 380° F. for 30 to 60 seconds and cooled. The so-processed fabric had an adhesion to the vinyl chloride resin coating in the range of from 12–18 lbs. per inch whereas using the same polyvinyl resin in the absence of the above adhesive composition, the adhesive bond was only about 4 lbs. per inch.

The following examples illustrate additional compositions which may be employed in the process having the same manipulative procedure as employed in Example 1.

EXAMPLE 2

PART A

| | |
|---|---|
| Resorcinol (1 molecular equivalent) ____parts__ | 110.1 |
| 37% formaldehyde (1.4 molecular equivalents) _____do____ | 114 |
| NaOH _____do____ | 2.5 |
| Water _____do____ | 2208 |
| | 2434.6 |

PART B

RF resin to vinyl resin solids 1:6:

| | |
|---|---|
| Resin master (part A) _____parts__ | 244 |
| 55% vinyl chloride-acetate latex _____do____ | 162 |
| Aqua ammonia _____do____ | 4 |
| Water _____do____ | 662 |
| | 1072 |

EXAMPLE 3

PART B

RF resin to vinyl resin solids 1:4:

| | |
|---|---|
| Resin master (part A) (1:2 molecular equivalents) _____parts__ | 336 |
| 55% vinyl chloride-acetate latex _____do____ | 153 |
| Aqua ammonia _____do____ | 4 |
| Water _____do____ | 575 |
| | 1068 |

EXAMPLE 4

PART B

RF resin to vinyl resin solids 1:2:

| | |
|---|---|
| Resin master (part A) (1:2 molecular equivalents _____parts__ | 560 |
| 55% vinyl chloride-acetate latex _____do____ | 127 |
| Aqua ammonia _____do____ | 4 |
| Water _____do____ | 377 |
| | 1068 |

It will be obvious to one skilled in the art that the foregoing description and the specific embodiments I have shown therein are illustrative of the principles of this invention and subject to additional modifications and variations without departing from such principles. Therefore, this invention includes all features and embodiments encompassed within the spirit and scope of the following claims.

I claim:
1. A process for bonding a synthetic fibrous material selected from the group consisting of nylon, polyethylene terephthalate esters and polymeric acrylonitrile fiber forming materials to a vinyl resin, which comprises impregnating said material with an organic solvent-free, aqueous bonding mixture including a partially condensed resorcinol-formaldehyde reaction product containing free resorcinol and a latex selected from the group consisting of polyvinyl chloride and vinyl chloride-vinyl acetate copolymer latices, wherein the ratio of resorcinol-formaldehyde reaction product containing free resorcinol to latex solids is within the range of about 1:12 to about 1:3, thereafter heating the thus impregnated material to remove the water therefrom and complete condensation between said resorcinol and formaldehyde at a temperature between about 240° and 330° F. and applying a coating of vinyl resin to the surface of said material.

2. A process for bonding a synthetic fibrous material selected from the group consisting of nylon, polyethylene terephthalate esters and polymeric acrylonitrile fiber forming materials to a vinyl resin which comprises (a) preparing an organic solvent-free resol comprising an aqueous dispersion of partially condensed resorcinol-formaldehyde reaction product containing free resorcinol by reacting resorcinol and formaldehyde in a ratio of from 1:1.2 to 1:2.75 in water; (b) mixing the resulting resol with an organic solvent-free latex selected from the group consisting of latices of polyvinyl chloride and vinyl chloride-vinyl acetate copolymer in an amount such that the ratio of resol to latex solids is within the range of about 1:12 and 1:3; (c) then impregnating said material with the resulting aqueous, organic solvent-free dispersion of resol and latex; (d) heating the thus impregnated material at a temperature within the range of 240° to 330° F. to complete condensation between the resorcinol and formaldehyde in situ; and then applying a coating of vinyl resin to the surface of said material.

3. The process of claim 2 wherein said resol is prepared by reacting said resorcinol and formaldehyde at a temperature between 72° and 78° F.

4. The process of claim 3 wherein said resol is prepared by reacting said resorcinol and formaldehyde in the presence of an alkaline catalyst.

5. The process of claim 4 wherein said reaction is carried out for a period of from about 3 to 12 hours.

6. The process of claim 2 wherein said latex has a pH of at least 7.

7. The process of claim 2 wherein said latex has a pH of at least 9.

8. The process of claim 2 wherein the resol mixed with latex has a solids concentration of between 6 and 20% by weight.

9. The process of claim 2 including the further step of applying a non-vulcanized vinyl resin coating to the thus treated material followed by heating at elevated temperature.

References Cited in the file of this patent
UNITED STATES PATENTS

| | | |
|---|---|---|
| 2,514,196 | Bradley | July 4, 1950 |
| 2,659,708 | Berger et al. | Nov. 17, 1953 |
| 2,699,431 | Harvey et al. | Jan. 11, 1955 |
| 2,748,049 | Kalafus | May 29, 1956 |
| 2,879,178 | McWherter et al. | Mar. 24, 1959 |
| 2,891,876 | Brown et al. | June 23, 1959 |

FOREIGN PATENTS

| | | |
|---|---|---|
| 507,013 | Great Britain | June 7, 1939 |
| 670,197 | Great Britain | Apr. 16, 1952 |